United States Patent [19]

Harmuth

[11] Patent Number: 5,153,595
[45] Date of Patent: Oct. 6, 1992

[54] RANGE INFORMATION FROM SIGNAL DISTORTIONS

[75] Inventor: Henning F. Harmuth, Sydney, Australia

[73] Assignee: Geophysical Survey Systems, Inc., North Salem, N.H.

[21] Appl. No.: 499,014

[22] Filed: Mar. 26, 1990

[51] Int. Cl.⁵ .............................................. G01S 13/08
[52] U.S. Cl. ........................................ 342/22; 342/145
[58] Field of Search ................... 342/145, 22, 189, 124

[56] References Cited

U.S. PATENT DOCUMENTS

| Re. 28,811 | 5/1976 | Pierce | 179/15 |
|---|---|---|---|
| Re. 31,509 | 1/1984 | Neidell | 342/378 |
| 3,665,466 | 5/1972 | Hibbard | 342/59 |
| 3,713,096 | 1/1973 | Comfort et al. | 340/172 |
| 3,731,002 | 5/1973 | Pierce | 370/85 |
| 3,735,362 | 5/1973 | Ashany et al. | 340/172 |
| 3,806,795 | 4/1974 | Morey | 342/22 X |
| 3,900,878 | 8/1975 | Tsao | 342/459 |
| 3,906,213 | 9/1975 | Meriaux et al. | 342/378 X |
| 3,967,282 | 6/1976 | Young et al. | 342/22 |
| 4,114,153 | 9/1978 | Neidell | 342/108 |
| 4,161,731 | 7/1979 | Barr | 342/22 |
| 4,240,143 | 12/1980 | Besemer et al. | 364/200 |
| 4,282,589 | 8/1981 | Evetts et al. | 367/90 |

(List continued on next page.)

FOREIGN PATENT DOCUMENTS

| 0014926 | 2/1980 | European Pat. Off. . |
| 0233993 | 4/1982 | European Pat. Off. . |
| 0332818 | 1/1989 | European Pat. Off. . |
| 103166 | 6/1984 | Japan . |
| 8909446 | 10/1989 | PCT Int'l Appl. . |
| 9000283 | 1/1990 | PCT Int'l Appl. . |
| 2065941 | 7/1981 | United Kingdom . |

OTHER PUBLICATIONS

Lovett et al., Proceedings '88 Int'l. Conf. on Parrell Proc., vol. 1, Penn State Univ. Press (Conf. Aug. 15-19, 1988) pp. 303 et seq.

Kai Li et al., Proceedings '89 Int'l. Conf. on Parallel Processing, Penn State Univ. Press (Conf. Aug. 8-12, 1989) pp. I-125 et seq.
"High Performance/High Availability Interprocessor Communication Method," IBM Technical Disclosure Bulletin, vol. 31, No. 2, Jul. 1988, pp. 41-42.
Haridi et al, "The Cache Coherence Protocol of the Data Diffusion Machine" Parallel Architectures Proceedings, vol. I, pp. 1-18 (1989).
Warren et al, "Data Diffusion Machine—A Scalable . . . ", Proceedings of The International Conference on Fifth . . . , 1988, pp. 943-952.
Hagersten, "Some Issues on Cache-Only Memory Architecture," Scalable Shared-Memory Multiprocessors, May 1990, p. 12.
Hagersten et al, "The Data Diffusion Machine and Its Data Coherency Protocols," Proceedings of the IFIP, pp. 127-148 (1990).

Primary Examiner—John B. Sotomayor
Attorney, Agent, or Firm—Wolf, Greenfield & Sacks

[57] ABSTRACT

An electromagnetic signal having originally the time variation of a rectangular pulse is transmitted into a medium with conductivity $\sigma$. It is distorted by the medium to a signal $f(\sigma,d,t)$ if it traveled the distance d from a transmitter to a scattering or reflecting object and the same distance d back to the transmitter. The time variation $f(\sigma,d,t)$ of the distorted signal can be calculated for any conductivity $\sigma$ and distance d. Using the conductivity $\sigma$ known from previous measurements, the returned, distorted signal $f(t)$ is compared with computed distorted signals $f(\sigma,d,t)$ for various distances d. The computed signal $f(\sigma,d,t)$ that is most similar to the actually received signal $f(t)$ determines the distance d to the scattering or reflecting object. The comparison between the computed, distorted signals and the actually received signal is done by cross-correlations. The peak amplitude or the energy of the received signal becomes unimportant if cross-correlation is used, which means the physical size or radar cross-section of the scattering or reflecting object becomes unimportant.

13 Claims, 4 Drawing Sheets

U.S. PATENT DOCUMENTS

| | | | |
|---|---|---|---|
| 4,293,945 | 10/1981 | Atia et al. | 370/17 |
| 4,322,795 | 3/1982 | Lange et al. | 364/200 |
| 4,430,653 | 2/1984 | Coon et al. | |
| 4,484,262 | 11/1984 | Sullivan et al. | 364/200 |
| 4,510,492 | 4/1985 | Mori et al. | 370/85 |
| 4,598,400 | 7/1986 | Hillis | 370/60 |
| 4,604,694 | 8/1986 | Hough | 364/200 |
| 4,625,081 | 11/1986 | Lotito et al. | 379/88 |
| 4,646,271 | 2/1987 | Uchiyama et al. | 365/49 |
| 4,675,595 | 6/1987 | Hane | 342/22 X |
| 4,688,185 | 8/1987 | Magenheim et al. | 364/563 |
| 4,698,634 | 10/1987 | Alongi et al. | 342/22 |
| 4,701,756 | 10/1987 | Burr | 370/60 |
| 4,706,080 | 11/1987 | Sincoskie | 370/94 |
| 4,717,252 | 1/1988 | Halldorsson et al. | 342/22 X |
| 4,721,961 | 1/1988 | Busignies et al. | 342/458 |
| 4,734,907 | 3/1988 | Turner | 370/60 |
| 4,754,394 | 6/1988 | Brantley, Jr. et al. | 364/200 |
| 4,797,980 | 1/1989 | Bussey, Jr. et al. | 370/60 |
| 4,811,009 | 3/1989 | Orimo et al. | 370/85 |
| 4,812,850 | 3/1989 | Gunton et al. | 342/22 |
| 4,814,970 | 3/1989 | Barbagelata et al. | 364/200 |
| 4,829,227 | 5/1989 | Turner | 370/60 |
| 4,839,654 | 6/1989 | Ito et al. | 342/22 |
| 4,845,702 | 7/1989 | Melinda | 370/1 |
| 4,885,742 | 12/1989 | Yano | 370/94 |
| 4,896,116 | 1/1990 | Nagashima et al. | 342/22 X |
| 4,951,055 | 8/1990 | Katayama | 342/22 |
| 4,951,193 | 8/1990 | Muramatsu et al. | 364/200 |
| 4,984,235 | 1/1991 | Hillis et al. | 370/60 |
| 5,012,248 | 4/1991 | Munro et al. | 342/22 |

RANGE INFORMATION FROM SIGNAL DISTORTIONS

FIELD OF THE INVENTION

This invention relates to the determination of range information when a radar signal propagates through a medium which introduces substantial signal distortion.

BACKGROUND OF THE INVENTION

A conventional radar derives the range of a target from a measurement of the round-trip time of a signal. This method works if the transmission medium produces negligible signal distortions. This condition is typically satisfied if the transmission medium is the atmosphere, empty space, dry ground, solid rock, ice, or the like. There are other transmission media that produce such large signal distortions that the measurement of range based on round-trip time fails. Typical examples are media containing water, ranging from minerals with low water content at one extreme to water with low mineral content at the other extreme; another example is hot or molten rock at great depths of the Earth. In these cases, one can still obtain range information of scattering or reflecting objects by observing the distortions of the returned signal.

The measurement of range or distance of scattering or reflecting objects by means of the radar principle discussed above has been known for more than eighty years. The round trip time $\Delta T$ of an electromagnetic signal returned by a scattering or reflecting object is observed and the range $d = c\Delta T/2$ is derived from velocity of light $c = 1/\sqrt{\epsilon\mu}$, where $\epsilon$ and $\mu$ are the permittivity and the permeability of the medium. This approach works as long as the conductivity $\sigma$ of the medium can be ignored, which is the case in vacuum, the atmosphere, dry soil or rock, etc. If significant amounts of water are present or if electromagnetic signals are used to probe hot or molten rock, the conductivity $\sigma$ can no longer be ignored. Signals transmitted through such a medium are significantly distorted, which makes the definition of a round trip time $\Delta T$ difficult, and the propagation velocity of the signals is no longer defined by $c = 1/\sqrt{\epsilon\mu}$. Hence range determination by means of the conventional radar principle is no longer possible.

In order to overcome this difficulty, one must study the propagation of electromagnetic signals in lossy media. This study ran into an unexpected obstacle. It was found that Maxwell's equations, which are the basis for electromagnetic wave transmission, fail for the propagation of pulses or "transients" in lossy media. The reason turned out to be the lack of a magnetic current density term analogous to the electric current density term. Such a magnetic current density term does not occur in Maxwell's equations because magnetic charges equivalent to negative electric charges (electrons, negative ions) or to positive electric charges (positrons, protons, positive ions) have not been observed reliably. However, currents are not only carried by charges but also by dipoles or higher order multipoles. For instance, the electric current flowing through the dielectric of a capacitor is carried by electric dipoles, which is the reason why the "polarization" current in a capacitor is different from the current in a resistor that is carried by charges or monopoles. Since magnetic dipoles are known to exist, the magnetic compass needle being such a dipole, there must be magnetic polarization currents carried by these dipoles, and this fact calls for a magnetic density term in Maxwell's equations; the existence of magnetic charges or monopoles is neither implied nor denied by such a term.

The modification of Maxwell's equations and the transient solutions derived from the modified equations are discussed in H. F. Harmuth, *Propagation of Nonsinusoidal Electromagnetic Waves*, Academic Press, New York 1986, which is hereby incorporated by reference. Using these solutions, the propagation and distortion of electromagnetic signals was further studied in the PhD thesis "Propagation velocity of electromagnetic signals in lossy media in the presence of noise", by R. N. Boules, Department of Electrical Engineering, The Catholic University of America, Washington D.C., 1989. This thesis contains computer plots of distorted signals having propagated in lossy media with a certain conductivity $\sigma$ over various distances. In particular, the case $\sigma = 4$ S/m, relative permittivity 80, and relative permeability 1—which are typical values for sea water—is treated in some detail.

SUMMARY OF THE INVENTION

According to the invention, an electromagnetic signal having originally the time variation of a rectangular pulse is transmitted into a medium with conductivity $\sigma$. It is distorted by the medium to a signal $f(\sigma,d,t)$ if it traveled the distance d from a transmitter to a scattering or reflecting object and the same distance d back to the transmitter. The time variation $f(\sigma,d,t)$ of the distorted signal can be calculated for any conductivity $\sigma$ and distance d. If the conductivity $\sigma$ is known from previous measurements, such as 4 S/m for sea water, the returned, distorted signal $f(t)$ can be compared with computed distorted signals $f(\sigma,d,t)$ for various distances d. The computed signal $f(\sigma,d,t)$ that is most similar to the actually received signal $f(t)$ determines the distance d to the scattering or reflecting object.

The comparison between the computed, distorted signals and the actually received signal is done by cross-correlations. The peak amplitude or the energy of the received signal becomes unimportant if cross-correlation is used, which means the physical size or radar cross-section of the scattering or reflecting object becomes unimportant.

The invention will be better understood from the detailed description below, which should be read in conjunction with the accompanying drawing.

Detailed Description

Figure 1:
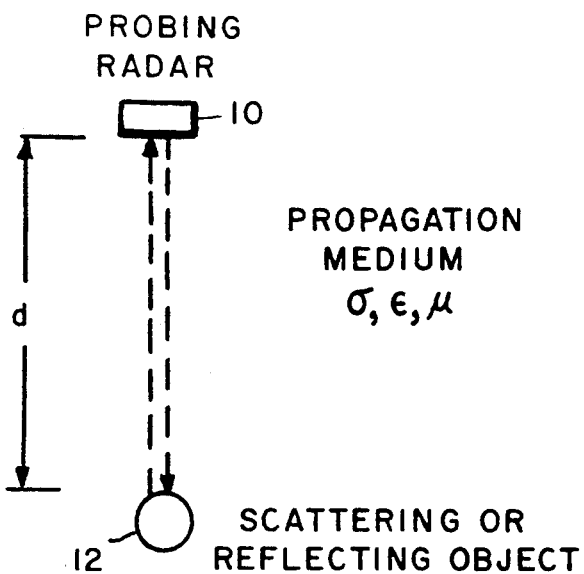
FIG. 1 diagrammatically illustrates a probing radar sending pulses to a reflecting object at a distance d and receiving the reflected signal after it has propagated the round-trip distance 2d through a medium of permittivity $\epsilon$, permeability $\mu$ and conductivity $\sigma$.

FIG. 1 shows a probing radar 10 that radiates an electromagnetic pulse down to a scattering object 12 at a distance d and receives a returned signal that has traveled the distance 2d in the time $\Delta T = 2d/c$. If the propagation velocity c of the pulse is known, one can obtain the distance d from a measurement of the round-trip propagation time $\Delta T$. This is the well known principle of range determination used in radar. The expression "probing radar" is used here to emphasize that the radar looks down into the ground or into water rather than up into the atmosphere as most radars do.

Figure 2:
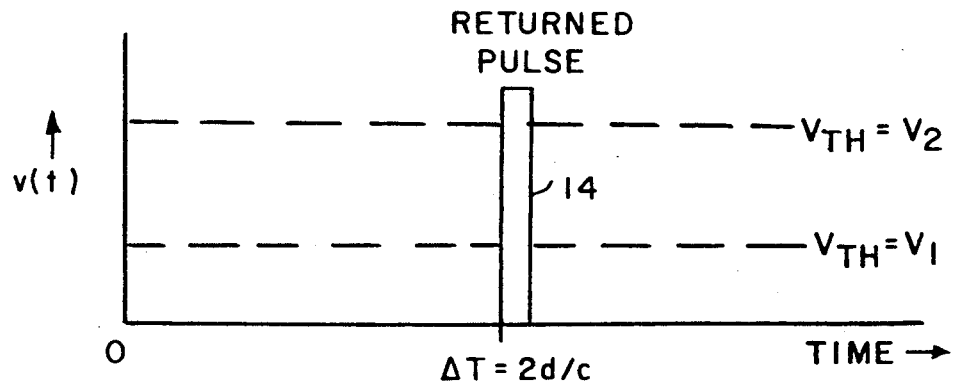
FIG. 2 is the time diagram of an undisturbed returned pulse in the system of FIG. 1, backscattered or reflected by an object at the distance d.

The measurement of the round trip time $\Delta T$ is shown in more detail in FIG. 2, which shows what one observes on a cathode ray tube of a radar used for range measurement. The returned pulse 14 is shown to begin at the time $\Delta T = 2d/c$; the duration of the pulse is not important for the discussion. The time of detection $\Delta T$ and thus the distance $d = c\Delta T/2$ is determined by the crossing of the threshhold voltage $V_{TH}$ by the rising edge of the pulse. The distance d depends very little or not at all on the choice of threshold voltage (e.g., $V_{TH}=V_1$ or $V_{TH}=V_2$) if the returned pulse is not distorted or very little distorted and its leading edge rises very fast. This condition is typically satisfied for pulses that propagate through a non distorting or little-distorting medium like vacuum or the atmosphere.

In terms of Maxwell's equations, the time diagram of FIG. 2 and the range determination by a propagation time measurement works if the medium's conductivity $\sigma$ equals zero and its permeability $\mu$ as well as its permittivity $\epsilon$ are scalar constants. No signal distortions occur in this case since there are no losses. The propagation velocity c of the pulse is given by $c = 1/\sqrt{\epsilon\mu}$.

The method of range determination by means of the propagation time measurement of the leading edge of a pulse breaks down for media with a significant conductivity. Such media are typically mixtures of minerals and water, ranging from soil with some water content to water with some mineral content. A second typical medium consists of either hot or molten rocks. The mechanism causing a significant conductivity is different in these two examples, but what counts is the value of the conductivity $\sigma$, not the mechanism that causes it.

Figure 3:
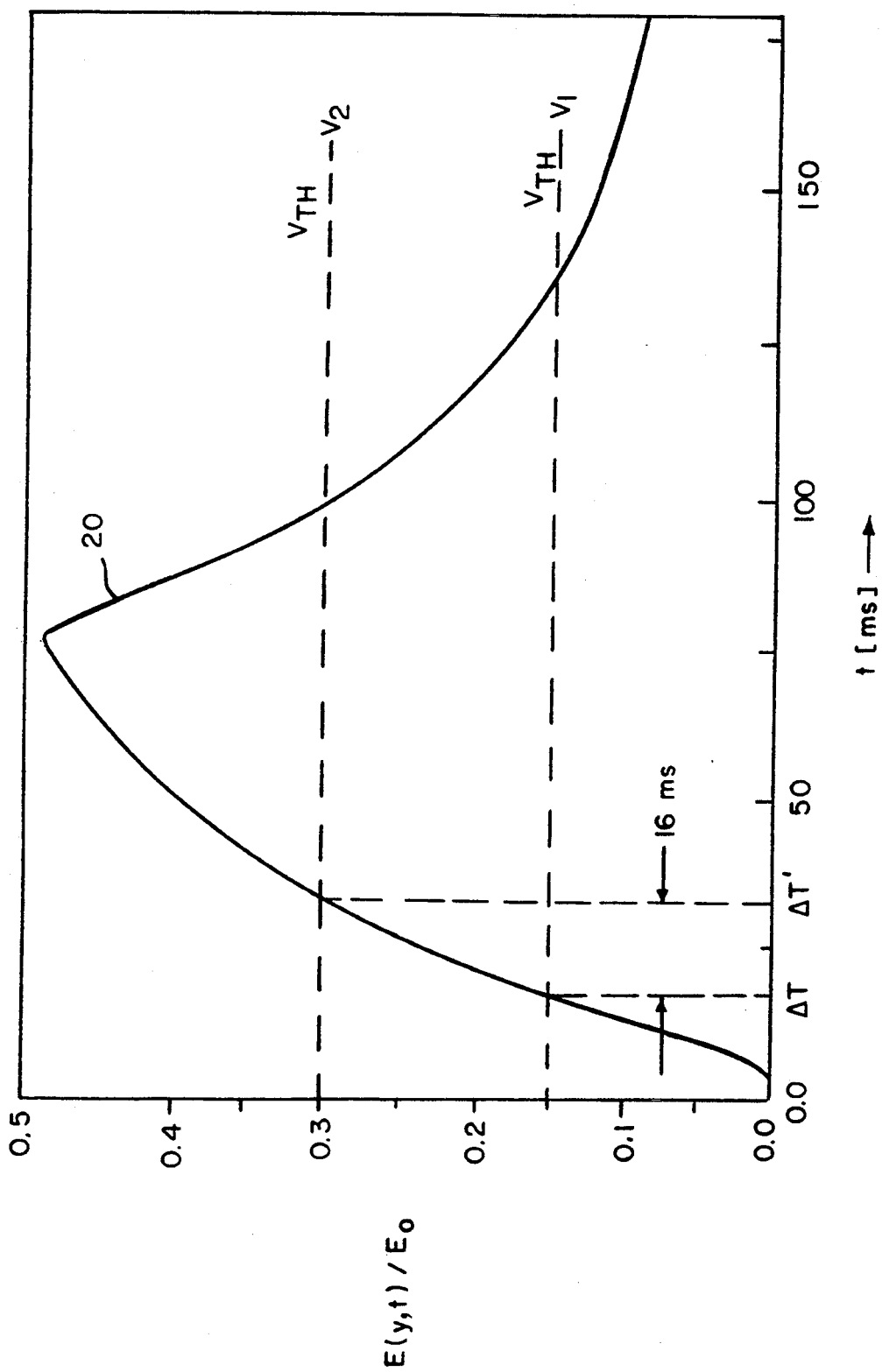
FIG. 3 shows the time variation of the electric field strength $E(y,t)/E_0$ of an originally rectangular pulse of duration 71.4 ms and amplitude $E_0$ after having propagated 1.1 km through a medium with conductivity 4 S/m, relative permittivity $\epsilon/\epsilon_0 = 80$, and relative permeability $\mu/\mu_0 = 1$, where $\epsilon_0$ and $\mu_0$ are the permittivity and permeability of free space, respectively.

For an explanation, refer to FIG. 3. It shows the waveform 20 depicting the time variation of the electric field strength of an originally rectangular pulse of duration 71.4 ms and amplitude $E_0$ after propagating the distance $y = 1.1$ km through a medium with conductivity $\sigma = 4$ S/m, relative permittivity $\epsilon_r = 80$, and relative permeability $\mu_r = 1$; these values of $\sigma$, $\epsilon$ and $\mu$ are typical for either water with a content of 4% NaCl or certain types of molten rock. The choices of the threshhold voltage $V_{TH}=V_1$ or $V_{TH}=V_2$ strongly affects the time of detection $\Delta T$ and thus the observed distance d of an object. This illustration is based on FIGS. 6-10 of the previously mentioned PhD thesis of R. N. Boules, which is hereby incorporated by reference. The arrival times measured with threshhold voltages $V_{TH}$ set at $V_1$ or $V_2$ now differ by 16 ms. If we use the formula $c = 1/\sqrt{\epsilon\mu}$ as a definition of the propagation velocity, then $c = 33541$ km/s and a time difference of 16 ms becomes a distance difference of 268 km between a threshhold voltage $V_{TH}$ set to $V_1$ or $V_2$.

A distance measurement by observation of the arrival time of the leading edge of this pulse is clearly not possible.

There is still a second effect that works against range determination from time measurement. If one uses in FIG. 3 the threshhold voltage $V_{TH}=V_1$, one uses only the energy of the pulse received at times $t < \Delta T$, while almost all the energy of the pulse is at times $t > \Delta T$. Hence, very poor use is made of the signal energy. One might think that a much shorter pulse would solve this problem, but this is not feasible in reality. In a medium with losses caused by the conductivity $\sigma$, one must use long pulses since they lose less energy due to absorption than short pulses. A new principle to derive range information must be found for media with losses.

Such a new principle is taught herein. Given certain values of conductivity $\sigma$, permittivity $\epsilon$, and permeability $\mu$ the time variation of the electric field strengths $E(y_n,t)/E_0$ for $n = 1, 2, \ldots$, produced by an originally rectangular pulse with amplitude $E_o$ and duration T that has propagated the distance $y_n$. If an electric field of amplitude $E(y,t)$ is received, it can be compared with the computed field strengths $E(y_n,t)$. For a certain value of $n = n'$ the mean-square difference $$\int_0^\infty [E(y,t) - E(y_n,t)]^2 dt = \min! \tag{1}$$

will be a minimum and the propagated distance y will be closest to a particular distance $y_n$ of the calculated field strengths $E(y_n,t)$. The distance $y_n$ is thus obtained by the comparison of the time variation of the received (electric) field strength with stored sample field strengths.

The limits 0 and $\infty$ in Eq.(1) require some explanation. The lower limit 0 denotes the time at which the beginning of the pulse can arrive that was returned from the smallest distance of interest. The upper limit, $\infty$, denotes the time when the end of the pulse can arrive from the greatest distance of interest.

Equation (1) can be rewritten:

$$\int_0^\infty E^2(y,t)dt + \int_0^\infty E^2(y_n,t)dt - 2\int_0^\infty E(y,t)E(y_n,t)dt = \min! \tag{2}$$

The first integral has the same value for any $y_n$ and thus does not contribute to the decision for which $y_n$ Eq.(2) yields a minimum. We may leave out this term and rewrite the rest of Eq.(2) as follows:

$$\int_0^\infty E(y,t)E(y_n,t)dt - 0.5\int_0^\infty E^2(y_n,t)dt = \max! \tag{3}$$

The first integral is the cross-correlation of the received field strength $E(y,t)$ with the sample function $E(y_n,t)$, if they coincide in time. If we produce the cross-correlation function $$\int_0^\infty E(y,t - \tau)E(y_n,t)dt, \quad (4)$$

we will get the first integral in Eq.(3) for $\tau=0$, that means when the largest peak of the auto-correlation function for $y=y_n$ occurs. The second integral can be obtained by computation for any desired distance $y_n$.

Figure 4:
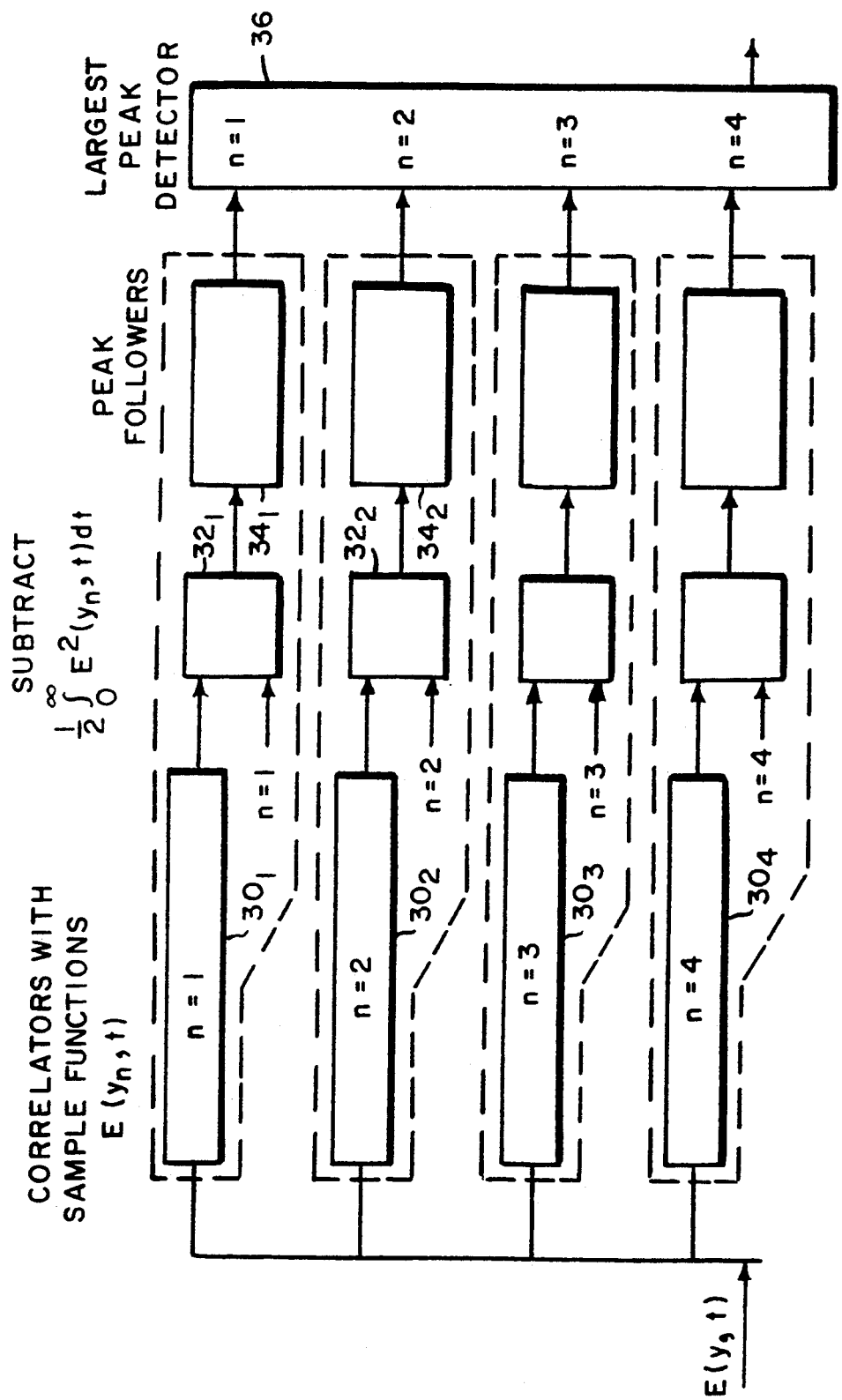
FIG. 4 is a block diagram showing a bank of sliding correlators that correlate a received signal $E(y,t)$ with sample signals computed for various possible distances d of the target.

A block diagram of a circuit that compares a received field strength $E(y,t)$ with computed sample field strengths $E(y_n,t)$ to obtain the value $y_n$ closest to y may now be derived and is shown in FIG. 4. It should be pointed out that one would generally not implement such a circuit in hardware, but would use a programmed digital computer, instead. The received field strength $E(y,t)$ can be sampled, digitized, and stored for a comparison with the sample functions $E(y_n,t)$ at a later time. There is no need to do this comparison in real time since the information about the distance y propagated by the signal is contained in its time variation, which can be stored. This is completely different from the usual measurement of distance by a radar based on the arrival time of a signal; this measurement must be made in real time.

The received electric field strength $E(y,t)$, either as it is received or after sampling, digitizing, and perhaps storing, is fed to several sliding correlators $30_i$ that cross-correlate it with previously computed functions $E(y_n,t)$ for various values of n. The output of these sliding correlators represents Eq.(4) for the values of n chosen, in particular for the value $T=0$ when the beginning of $E(y,t)$ and $E(y_n,t)$ coincide; when this particular time occurs is not of interest here, but this time can be determined by additional processing. The second integral in Eq.(3), which has a constant value for each distance $y_n$ that can be computed ahead of time, is subtracted in subtractors $32_i$.

Figure 5:
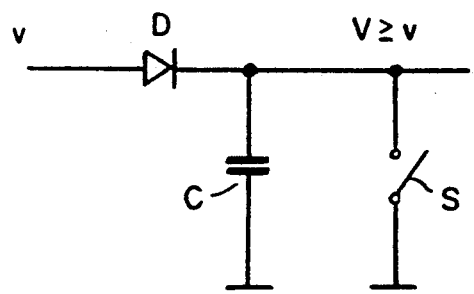
FIG. 5 is a simplified schematic circuit diagram of a peak voltage follower implemented by a diode D, a capacitor C, and a reset switch S.

This produces the function $$\int_0^\infty E(y,\tau)E(y_n,t)dt - 0.5 \int_0^\infty E^2(y_n,t)dt = F(\tau)$$

for the chosen values of n. Next, the peak value of this function is found for each n, by peak followers $34_i$. Implementation of such a peak follower as a circuit for voltages may be by means of a diode that feeds into a small capacitor as shown in FIG. 5. If the reset switch is momentarily closed at the time $t=0$, the voltage V across the capacitor at any time $t_0>0$ will be equal to the largest value of v in the time interval $0<t<t_0$. In a digital processor one achieves the same result by comparing a "stored number" with the "next arriving number"; the larger of the two becomes the new "stored number". The process of comparison is continued for as long as cross-correlation functions of the received signal are produced.

At the end of the correlation period the peak followers in FIG. 4 contain the largest value—which is a voltage if implemented in hardware and a binary number if computer processing is used—of the respective cross-correlation function. One still must determine which of the $n=1, 2 \ldots$ peak values is the largest one. A typical method to do so that works either in hardware implementation or for computer processing is to compare the output value of the peak followers for $n=1$ and $n=2$ in FIG. 4. The smaller value say—for $n=2$—is discarded. The larger output—for $n=1$ in our case—is then compared with the output value of the peak follower for $n=3$, etc. The block 36 finds the largest peak.

The value of n for which the largest value of all the peak followers is obtained determines the distance $y_n$ closest to the actually propagated distance y of the received electric field strength $E(y,t)$.

In other words, certain precomputed constants are subtracted from the produced cross-correlation functions and the peak value of each produced function is determined. The largest peak n determines the distance $y_n$ traveled by the distorted signal.

As an example consider the case where the range of interest is $0<y<800$ m. This range is divided into 8 range cells $0<y<100$ m, $100$ m$<y<200$ m, $\ldots$, $700$ m$<y<800$ m. Eight functions $E(y_n,t)$, for $y_n=50$ m, $150$ m, $\ldots$, $750$ m must be computed and FIG. 4 requires $n=1, 2, \ldots, 8$ correlators.

When the processing is done by computer, one can use a more efficient principle than that illustrated by FIG. 4. According to FIG. 6, only the two circuits $42i$ and $44i$ of FIG 4 are needed for sample signals $E(y_n,t)$ with $n=1$ and $n=2$. The first is set for a distance of $y_n=200$ m, the second for a distance of $y_n=600$ m. Assume the received signal $E(y,t)$ had traveled a distance y in the range $500$ m$<y<600$ m. Since $y_n=600$ m is closer to y than $y_n=200$ m, the output $V_1>V_0$ is supplied in FIG. 6. Next, the same signal $E(y,t)$ is processed with sample signals $E(y_n,t)$ with $y_n=y_{01}=500$ m and $y_n=y_{11}=700$ m. According to FIG. 6, two outputs $V_{10}$ and $V_{11}$ are generated, with $V_{10}>V_{11}$, since $y_{10}=500$ m is closer to y than $y_{11}=700$ m. The same signal $E(y_n,t)$ with $y_n-y_{100}=450$ m and $y_n=y_{101}-550$ m is shown in lower right of FIG. 6. Now, we get $V_{101}>V_{100}$, since y is closer to 550 than to 450 m.

Figure 6:
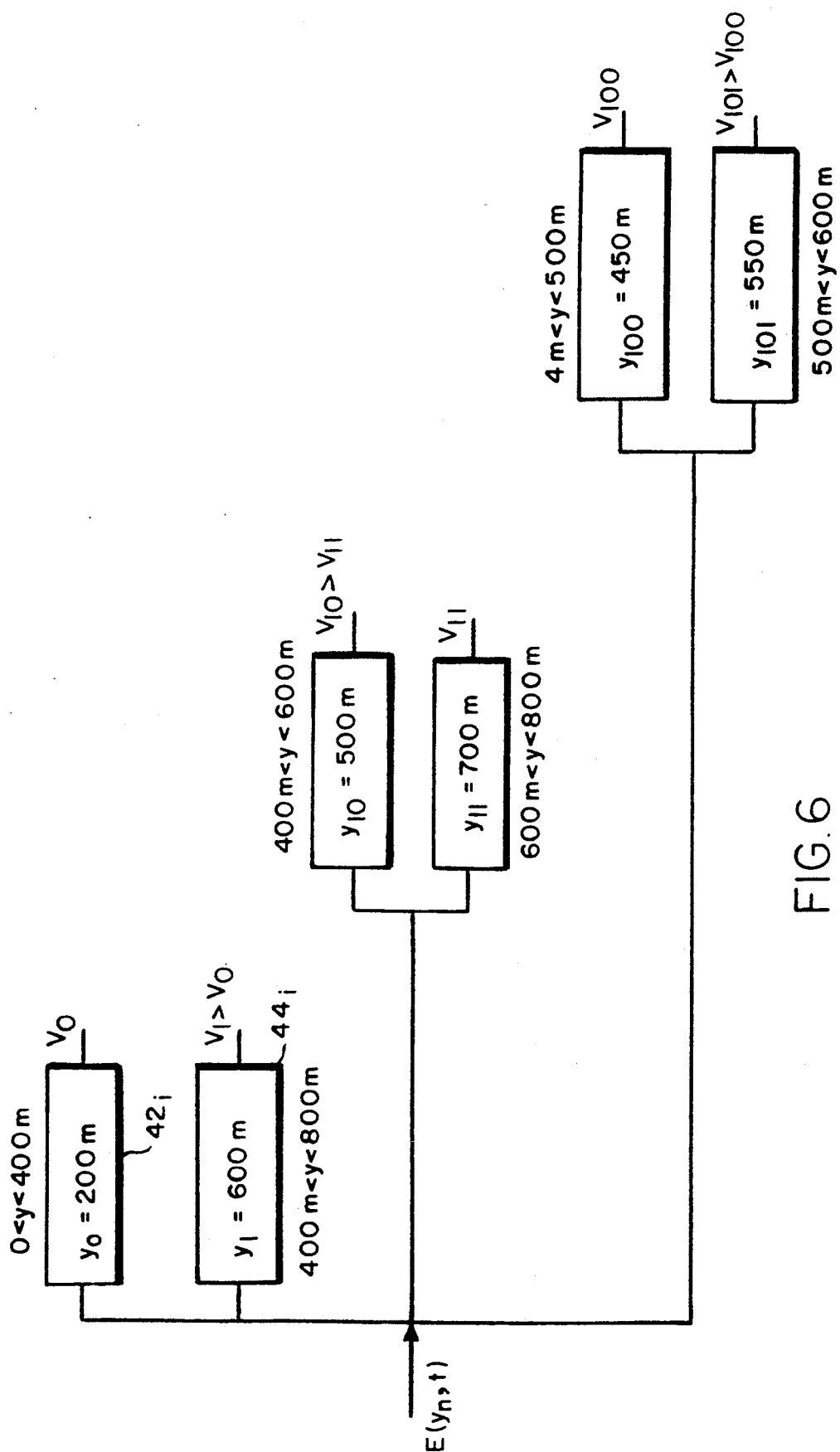
FIG. 6 is a block diagram for an apparatus permitting determination of the distance y of an object with 2m correlations rather than $2^m$ correlations, if $2^m$ is the number of range cells.

The principle of FIG. 6 requires 6 cross-correlations to discriminate between 8 range cells, while the apparatus of FIG. 4 requires 8 cross-correlations. This is only a small saving. However, if one uses 16, 32, $\ldots$, $2^m$ range cells, the apparatus of FIG. 6 requires 8, 10, $\ldots$, 2m correlations while the apparatus of FIG. 4 requires 16, 32, $\ldots$, $2^m$ correlations.

The method of FIG. 6 clearly requires that the received signal is stored and thus available as often as needed.

Having thus described the basic concept of the invention, it will be readily apparent to those skilled in the art that the foregoing detailed disclosure is intended to be presented by way of example only, and is not limiting. Various alterations, improvements, and modifications will occur and are intended to those skilled in the art, though not expressly stated herein. These modifications, alterations, and improvements are intended to be suggested hereby, and are within the spirit and scope of the invention. Accordingly, the invention is limited only by the following claims and equivalents thereto:

What is claimed is:

1. A method for range determination in a lossy medium, comprising the steps of:
    radiating an electromagnetic pulse into the lossy medium;
    receiving a distorted electromagnetic pulse reflected from a target at a distance in the medium;
    determining the range of the target by comparing the received pulse to a plurality of distorted sample pulses each representing a different travel distance through the medium, without regard to travel time through the medium and without determination of any pulse arrival time.

2. The method of claim 1 wherein the step of comparing includes the steps of;
   determining the mean-square-difference between the received pulse and each sample pulse;
   selecting the sample pulse which yields the smallest mean-square-difference; and
   assigning as the distance travelled by the received pulse, the distance associated with the selected sample pulse.

3. The method of claim 1 wherein the step of comparing includes the step of finding the maximum valve of the function $$\int_0^\infty E(y,t)E(y_n,t)dt - 0.5 \int_0^\infty E^2(y_n,t)dt$$

for the received pulse of field strength $E(y,t)$, and the sample pulses of field strength $E(y_n,t)$, for a plurality of values of the variable $y_n$, representing distances into the media.

4. The method of claim 1 wherein the radiated electromagnetic pulse is not a periodic sinusoidal wave.

5. The method of claim 1 or claim 4 wherein the radiated electromagnetic pulse is a rectangular pulse.

6. The method of claim 1 wherein the distortion of the received electromagnetic pulse is substantially caused by the electromagnetic pulse traveling through the lossy medium.

7. The method of claim 1 wherein the step of comparing includes the steps of;
   finding peak values of a function that correlates the received pulse and each sample pulse; and
   selecting the sample pulse associated with the largest peak value.

8. The method of claim 7 wherein the step of selecting the sample pulse associated with the largest peak value is followed by the step of assigning as the distance travelled by the received pulse, the distance through the media associated with the selected sample pulse.

9. The method of claim 8 wherein the step of assigning the distance travelled by the received pulse, is followed by equating the range of the target to one half of the distance travelled by the pulse.

10. The method of claim 1 wherein the step of determining the distance that the pulse has travelled through the media is done in real time as echo information is being received.

11. The method of claim 1 wherein the step of comparing the received pulse with sample pulses, includes the steps of;
    recording the received pulse; and
    comparing the recorded received pulse with the sample pulses at a time after the received pulse was received.

12. The method of any of claims 1-3, wherein the step of comparing includes the step of computing the shape and amplitude of sample pulses for a plurality of distances through the media.

13. The method of any of claims 1-3, wherein the step of comparing includes the step of measuring the shape and amplitude of sample pulses that have travelled a plurality of distances through the media.

* * * * *